July 24, 1956
G. E. ROWE
2,755,597
GLASSWARE FORMING MECHANISM
Filed Nov. 30, 1951
FIG.1
FIG.2
FIG.3
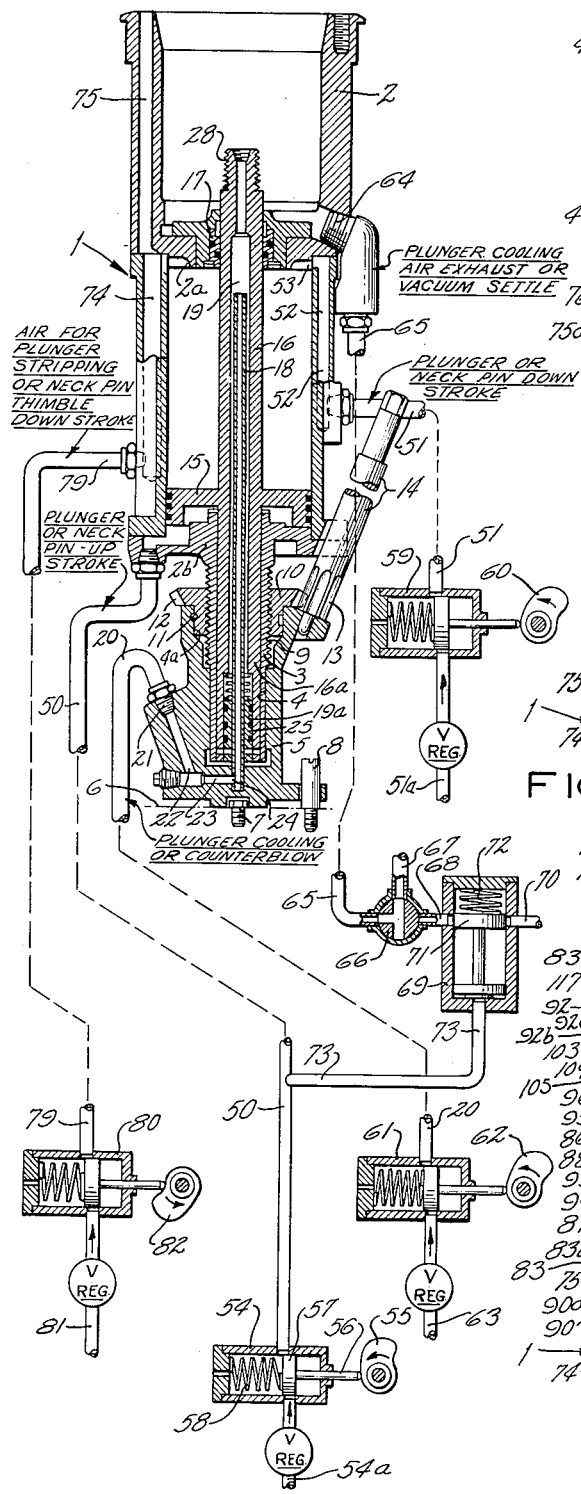
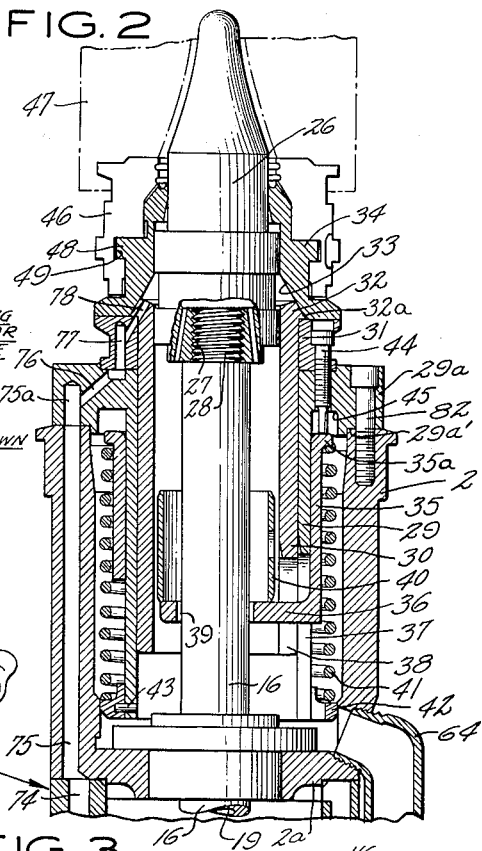
INVENTOR
GEORGE E. ROWE
BY Parham & Bates
ATTORNEYS

United States Patent Office 2,755,597
Patented July 24, 1956

2,755,597

GLASSWARE FORMING MECHANISM

George E. Rowe, Wethersfield, Conn., assignor to Emhart Manufacturing Company, Hartford, Conn., a corporation of Delaware Application November 30, 1951, Serial No. 259,050

9 Claims. (Cl. 49—9)

This invention relates generally to the manufacture of hollow glass articles, typically bottles and jars, as accomplished by forming charges of molten glass into hollow parisons in parison molds, transferring the parisons to final forming molds and blowing them to final form therein.

Two different methods, respectively known as blow-and-blow and press-and-blow methods, are employed in the manufacture of such articles. In the blow-and-blow method, the charge to be formed into the article desired is delivered to an inverted parison mold and is compacted or caused to settle therein by super-atmospheric fluid pressure applied to the upper surface thereof or by a partial vacuum in the lower portion of the parison mold. A vertically movable so-called neck pin projects from below through a thimble into the extreme lower end portion of the inverted parison mold when the neck pin is in its raised position. When this neck pin has been retracted downwardly, a small central initial blow cavity will be left in the extreme lower end portion of the compacted glass charge in the parison mold. Counterblowing of the glass charge in the parison mold to form the hollow parison desired then may be effected by applying counterblowing air to the initial cavity left by the withdrawal of the neck pin.

The blow-and-blow method is required or best suited for the manufacture of hollow glass articles of certain shapes, especially those which have relatively small diameter or "narrow" neck portions. On the other hand, the press-and-blow process is required or best suited for the manufacture of hollow glass articles or other shapes, as, for example, jars and other wide-mouth containers. In the press-and-blow method, a pressing plunger is thrust into the glass of a charge in the parison mold to press it to the form and shape desired for the parison.

A glassware forming machine for the production of glassware by the blow-and-blow method that is well known and in widespread use is the Hartford I. S. forming machine, an example of which is disclosed in Patent No. 1,911,119 of May 23, 1933. My Patent No. 2,508,890 of May 23, 1950, discloses a parison pressing mechanism incorporated in the Hartford I. S. machine in lieu of its parison forming provisions as disclosed in the earlier patent. The changes are such as to make removal and replacement of numerous operating parts, control provisions, etc. necessary if reconversion to blow-and-blow operation should be desired.

An object of the present invention is to provide for quick and easy change-over from a glass parison pressing setup substantially as shown in Patent No. 2,508,890 to a glass parison blowing mechanism suitable for use in blow-and-blow operations, or vice versa.

A further object of the invention is to provide a glass parison blowing conversion unit which, when substituted for the glass parison pressing unit, will include improved facilities for applying suction to the glass of a charge in an associate parison mold to aid formation therein of a blown parison and to reduce undesirable "settle waves."

A more specific object of the present invention is to provide in a compact conversion unit or "cartridge" the elements required to position and guide the neck pin involved in parison blowing operations operatively in relation to a parison blow mold at an overhead parison forming station, to connect the neck pin operatively with the pressing plunger operating means of the form of mechanism shown in my aforesaid Patent No. 2,508,890 when the pressing plunger has been detached from its operating means and the pressing plunger guiding and positioning elements have been removed, and to provide effective vacuum passages connecting the space in the lower or neck ring portion of the parison mold with an adjacent vacuum applying device to settle glass of a charge in the lower portion of the parison mold around the neck pin projecting thereinto.

A further object of the invention is to provide a conversion unit of the character described which, when substituted for the pressing plunger and plunger guiding and positioning means of the basic mechanism referred to, will utilize fluid pressure connections and control means of the basic mechanism.

Other objects and advantages of the invention hereinafter will be pointed out or will become apparent from the following description of a practical embodiment thereof, as illustrated in the accompanying drawings, in which:

Fig. 1 is a more or less diagrammatic vertical sectional view of the plunger operating means and connected permanent parts of the parison pressing mechanism involved after the pressing plunger and the pressing plunger guiding and positioning means have been removed;

Fig. 2 is a fragmentary sectional view of the upper portion of the structure shown in Fig. 1 with the pressing plunger and its guiding and positioning means in place, the plunger being shown at the end of an upward pressing stroke thereof in an inverted parison press mold at the overhead parison forming station, the press mold being indicated by dot-and-dash lines and only a fragmentary portion thereof being shown; and Fig. 3 is a view similar to Fig. 2 with the conversion unit substituted for the parison pressing plunger and the plunger guiding and positioning means of the Fig. 2 form of structure and showing the neck pin of the converted arrangement in a raised position in the lower end of an inverted parison blow mold at the parison molding station, the mold being indicated by dot-and-dash lines.

Referring now to Fig. 1, the permanent parts of the mechanism involved comprise a vertically disposed air cylinder 1 on which is mounted an open cylindrical holder 2. Bottom 2a of the holder constitutes the upper head of the cylinder 1. The cylinder 1 has a lower head 2b provided with a downward tubular extension 3 depending into the cavity 4 of a socket member 5 which rests upon a supporting surface 6. The supporting surface 6 may be the base of a complete glassware forming machine (not shown). The socket member 5 may be retained against any undesirable movement relative to the supporting surface 6 by positioning and retaining devices indicated at 7 and 8, respectively.

The downward tubular extension 3 of the lower cylinder head is provided with external screw threads 9 engaged with the screw threads of an adjusting nut 10. The adjusting nut 10 is rotatably mounted in a counterbored or enlarged upper portion 4a of the cavity of the socket member 5, being retained at 11 against vertical displacement from the socket member when the nut is turned. Nut 10 has an integral bevel gear portion 12 in mesh with an actuating pinion 13 which forms part of a suitably supported inclined rotatable adjusting rod 14. By turning the adjusting rod 14, the cylinder 1 will be adjusted vertically relative to the socket member 5 on the supporting base 6 and hence with relation to a parison mold (not shown in Fig. 1) at an overhead parison forming station.

A piston 15 in the cylinder 1 has an upwardly extending piston rod 16 projecting through a packing gland 17 in the upper head 2a into the holder 2. Also a downwardly extending rod 16a depending in the tubular member 3 nearly to the lower end thereof when the piston 15 is at the lower end of its stroke in the cylinder 1 as shown in Fig. 1. A vertical tube 18 is fixed at its lower end in the bottom of the socket member 5 so as to extend upwardly in and communicate with a bore 19 of the piston 15 and its rods 16a and 16. A suitable fluid pressure tube 20 is attached at 21 to the socket 5 so as to deliver air through communicating passages 22 and 23 in the wall of the socket member and a lateral opening 24 in the side of the lower end of the tube 18 to the interior of the latter end thence to the bore 19, this for a purpose to be presently described. The tube 18 may be surrounded by a suitable sealing arrangement indicated at 25 in a counter-bored lower portion 19a of the bore 19 of the depending lower piston rod 16a to preclude air leakage from the bore 19 to the interior of socket member 5.

The holder 2 is adapted to receive a removable assembly of parts for guiding and positioning a pressing plunger 26, Fig. 2. The pressing plunger 26 has a screw threaded axial socket 27 in its base and the upper end portion of the piston rod 16 is slightly reduced in diameter and is screw threaded at 28 so that the pressing plunger 26 may be attached thereto or detached therefrom when the piston rod is at the upper end of its stroke as shown in Fig. 2.

The assembly of pressing plunger positioning and guiding elements comprises a main cylindrical member 29 having an externally enlarged upper end portion 29a undercut peripherally at 29a' to fit against the inner corner edge of the upper end portion of holder 2 when the body of the cylindrical member 29 is lowered into the holder 2 so as to be supported therein and concentric therewith by the supporting contact of its upper end portion with the top of the holder. An annular space of considerable radial extent is provided between the body of cylindrical member 29 and the inner wall of the holder 2. A cylindrical bushing 30 fits snugly in member 29 and in a thimble rest ring 31 which surmounts the externally enlarged upper end portion 29a of the member 29. The bushing 30 may have an out-turned supporting lip 32 at its upper end slightly overlying the top of the ring 31. Lip 32 may have an outwardly and downwardly inclined outer face indicated at 32a fitting snugly against an upwardly inclined inner surface 33 of a portion of a thimble 34 when the thimble bears at its bottom surface upon the ring 31 as shown in Fig. 2. The ring 31 may be fastened to part 29a by cap screws (not shown) or by any other suitable known means.

A vertically shiftable sleeve 35 fits slidably on the body of the cylindrical member 29 and has an integral inwardly extending radial arm 36 extending through radially aligned vertical slots 37 and 38 in the cylindrical part 29 and bushing 30, respectively, to and beyond the center line of part 29. Arm 36 is apertured at 39 to provide a clearance for the piston rod 16. A spacer 40 stands on arm 36 in spaced concentric relation with the piston rod 16. This spacer is of less diameter than that of the lower or butt end of the pressing plunger 26. A compression coil spring 41 surrounds the sleeve 35 between an outwardly projecting flange 35a at the top of the sleeve and a collar 42 which fits on the lower end of the cylindrical part 29 and is secured in place thereon, as by a pin 43. The spring thus acts to urge the sleeve 35 upwardly to the limit of its stroke, this being determined by the contact of the flanged upper end of the sleeve with the lower end of a vertically adjustable stop screw 44 carried by upper end portion 29a of the part 29 and depending into an undercut annular space 45 in the bottom of enlarged upper end portion 29a of the part 29. This annular space 45 is of sufficient radial extent to accommodate the flanged upper end of the sleeve 35, thus permitting adjustment within limits of the height to which the sleeve may be raised by the action of the spring.

It will be understood that the assembly of pressing plunger positioning and guiding elements is insertible in the holder 2 as a unit before the plunger 26 is attached to the upper end of the piston rod 16 and at a time when the thimble 34 has been raised from the molding station by its neck ring 46 after the parison body mold 47 has been opened. In practice, the thimble 34 is a solid ring having an outwardly extending flange 48 at approximately its middle, this flange projecting into horizontal grooves 49 in the inner faces of the neck ring halves and supported thereby. The halves of the neck ring are openable but not enough to drop the thimble when the neck ring is given the usual transfer movements. The parison body mold 47 likewise is of the two-part type and when closed will hold the neck ring closed and the thimble in place.

The cylinder 1, Fig. 1, is provided with an air tube 50 connected with its lower portion for supplying operating air to its interior beneath the piston 15. Operating air for effecting a down stroke of piston 15 in this cylinder may be supplied thereto from an air tube 51 connected with a vertical passage 52 in a side wall of the cylinder, this vertical passage leading to a port 53 opening to the interior of the upper part of the cylinder. The air tube 50 is operatively connected at its end remote from cylinder 1 to the outlet of a valve 54 to which air is supplied from a suitable source at a regulated pressure by a supply pipe 54a. The valve 54 may have any suitable construction and mode of operation so as to supply operating air to the cylinder at a predetermined time in each of repeated cycles. By way of example, a rotating cam 55 is shown against the outer end of a valve stem 56 projecting from a slidable valve member 57 for controlling communication between the inlet and outlet of the valve 54. A spring 58 urges the valve member 57 toward the cam 55. The cam maintains the valve member 57 in position to shut off communication between the inlet and the outlet of the valve except for a portion of its cycle during which it is desired to supply air to the lower end of cylinder 1.

The air tube 51 is operatively connected to a valve indicated at 59 with which is associated a rotating cam 60 and an air intake pipe 51a. The time of delivery of air under a regulated pressure to the tube 51 and thence to the upper part of cylinder 1 may thus be predetermined.

The operating cycle of the pressing plunger 26 as effected by the reciprocation of the piston 15 in the cylinder 1 is substantially as follows: When the piston has been driven to the lower end of its stroke as shown in Fig. 1, the attached pressing plunger will be carried downward. The final part of this downward stroke will be attended by a downward movement of sleeve 35 and compression of the spring 41. On release of pressure from the upper part of cylinder 1, the spring 41 will force the sleeve upward to the limit of its stroke as determined by the stop screw 44 and this will return the pressing plunger to its loading position, which is well below the pressing position shown in Fig. 2. Upward movement of the piston 15 in the cylinder 1 will move the pressing plunger 26 from its loading position to the pressing position of Fig. 2 so as to produce the desired pressing of a glass charge (not shown) in the parison mold.

The air tube 20 is connected to a valve 61 controlled by a rotating cam 62 and having an air intake tube 63. At an appropriate time controlled by valve 61 air may pass through tube 20, passages 22, 23 and 24, and piston rod bore 19 to the interior of the pressing plunger 26 which may be desirably hollow for cooling purposes. Spent cooling air from the pressing plunger passes downwardly in the holder 2 to a pipe fitting 64 which is operatively connected with the wall of the holder at its bottom part. Pipe fitting 64 may be connected to an air tube 65 leading to a three-way valve 66 having an exhaust connection at 67 and an intake connection at 68 with a spool valve 69. The latter is operatively connected with a vacuum pipe 70. Operating air for moving a spool 71 in the valve 69 against the action of a spring 72 to open communication between pipe 70 and connection 68 is provided by a tube 73 operatively connecting one end of the valve 69 with the air tube 50. Valve 69 thus will be opened to vacuum when the valve 54 is open. The three-way valve 66 will close off vacuum from the tube 65 when in the position shown in Fig. 1. This is the condition when the pressing plunger is being used and as later will be explained will be changed when conversion to the Fig. 3 form of mechanism has been effected.

A vertical air passage 74 in the wall of cylinder 1 is in open communication at its top with a vertical passage 75 in a side wall of the holder 2. From the vertical passage 75, air may pass to a continuation thereof 75a in part 29a in Fig. 2 and thence through an inclined passage 76 to a passage 77 in the thimble rest ring 31 and thence through an inwardly and upwardly inclined passage 78 in the upper part of the bushing 30 to the interior of the thimble 34. Air is supplied to the passage 74 from a tube 79 leading thereto from a valve 80 having an air intake line 81 and controlled by a cam 82. This is timed in normal operation to supply air around the plunger during or immediately subsequent to the withdrawal of the plunger from its pressing position so as to puff or prevent collapse of the pressed parison.

In operation, the separate control valves may be elements of a valve block and their cams may be on a rotary drum substantially as disclosed in my aforesaid Patent 2,508,890 and as shown in detail in Patent No. 1,911,119.

The pressing plunger guiding and positioning assembly shown in Fig. 2 and as herein described may be retained in place in holder 2 by a screw 82 fastening the enlarged upper portion 29a of main cylindrical part 29 to the top of the holder. To remove this assembly as a unit or cartridge, the pressing plunger first is raised to its upper limit when the parison mold and thimble are away from the parison molding station and unscrewed from its operating rod. On removal of the fastening screw 82, the assembly of cartridge may be lifted from the holder 2. On downward retraction of the piston 15, the remaining or so-called "permanent" mechanism will be in the condition shown by Fig. 1 and is ready for the application thereto of the assembly of neck pin guiding and positioning parts.

This assembly in its inserted position is shown in Fig. 3. It comprises a cylindrical casing or shell 83 having an externally enlarged upper end portion 83a partially undercut at 83a' to fit on the upper end of the cylindrical holder 2 and fastenable thereto by the fastening screw 82. The cylindrical member 83 has an external peripheral rib or land 83b adjacent to its lower end having a sliding fit with the internal wall of holder 2 to center part 83 in the holder during insertion. Internally, cylindrical member 83 has a bore comprising a diametrically smaller upper portion 84 merged by a downwardly facing internal shoulder 85 into a diametrically larger or counterbored lower and somewhat longer portion 84a. An annular piston 86 has a reduced upper portion 86a slidably fitting in the internally smaller upper portion of member 83 and a diametrically larger portion 86b similarly fitting in its internally larger lower portion. A compression coil spring 87 has its upper end seated in an open-bottomed annular recess 88 in the lower end of the annular wall of piston 86 and its lower end resting on an internal retaining ring 89 which is supported in the lower end portion of the member 83, as by a snap ring 90 projecting inwardly from a groove 90a in the inner wall of that member. The spring 87 tends to maintain the piston at the upper end of its stroke in member 83, this being determined by the contact of the larger lower portion of the piston with the downwardly facing internal shoulder 85.

A thimble 91 of generally cylindrical form has its lower end portion disposed in the upper part of piston 86, to which it is detachably connected by a bayonet joint arrangement indicated at 92. The bayonet joint includes an internal annular groove 92a in the annular piston of greater vertical extent than the cooperative external flange 92b on the lower end of the thimble received therein. This tends to permit limited vertical play between the thimble and the connected piston. A vertical sealing bushing 93 is slidably disposed in the lower part of the piston 86 with its upper end pressed against the lower end of the thimble by compressed coil spring 94. Play between the thimble and piston thus is yieldingly resisted. The amplitude of vertical movements of the bushing 93 relative to the piston 86 is slight and is limited by a pin 95 projecting inwardly from the piston 86 into a short vertical slot 96 in the adjacent wall of the bushing 93.

A neck pin adapter 97 of tubular form fits slidably in the bushing 93 and has an internally screw threaded lower end portion fitting over and threadedly engaged at 98 with the externally threaded upper end portion 28 of the piston rod 16. A neck pin 99 fits slidably in the thimble 91, except for a suitably shaped reduced tip thereof indicated at 100, which projects through a central opening 101 in the top of the thimble when both the thimble and the neck pin are in their raised positions in a neck ring 102 as shown. The neck pin stands on the upper end of the adapter and their adjacent ends are appropriately flanged as indicated at 103 and 104, respectively, for engagement with a conventional split coupling ring 105 which fits slidably in the bushing 93 and thimble 91 and couples the neck pin and its adapter together. A sealing bushing 106 fits slidably in the upper end portion of the adapter and projects therefrom into a counterbore 107 in the bottom end of the neck pin. A coil spring 108 in the bushing 106 is compressed between a pin 109 which extends diametrically through a slotted lower end portion 110 of the bushing into the walls of the adapter and a downwardly facing shoulder 111 at the interior of the bushing near its upper end. This arrangement maintains the upper end of the bushing pressed yieldingly against the top wall of the counterbore 107 so as to seal the joint between the neck pin and its adapter.

A flat annular sealing plate 112 surrounds the thimble at the top of the enlarged portion 83a of the cylindrical member 83 and fits in a counterbore 113 in the top of the latter, being supported by the bottom wall of the counterbore.

A thimble guide ring 114 is carried by internally grooved portions 115 of the halves of the neck ring 102. The halves of the neck ring are overlapped and kept closed by the closed halves of a parison body mold 116 when the parison mold is at the molding station as shown. These parts are conventional and the neck ring and body mold are indicated only diagrammatically by dot-and-dash lines.

The vertical passage 75 in a wall of the holder 2 communicates at its upper end with a passage 117 in the outwardly enlarged upper portion 83a of the cylindrical member 83 so as to conduct operating air to the top of the piston 86 at an appropriate time for desirable downward retraction of the thimble. This operating air will force the piston downward against the action of the spring 87. The neck pin will be raised and lowered by the up and down strokes of the piston 15 in the cylinder 1 of the permanent structure and these are effected at suitable times by the means previously described. It of course will be understood that the air control valves are maintained closed during the conversion from press-and-blow to blow-and-blow operation, or vice versa.

The plug of the three-way valve 66 may be turned counterclockwise 90° from the position shown in Fig. 1 so as operatively to connect the vacuum pipe 70 with the tube 65 and its connections when the spool valve 69 is in its open position. A passage 118 is provided in a wall of thimble 91 in communication at its upper end with a suction groove 119 and vertical suction passages 119a between the halves of the neck ring and in communication at its lower end with a port 120 in the thimble wall. This port 120 communicates at its outer end with a space indicated at 121 above the piston 86. This space in turn communicates through a port 122 in the wall of cylindrical member 83 with a vertical annular space 124 between the member 83 and holder 2. The space 124 communicates at its bottom through a port 125 in the member 83 with the interior of the lower part of the latter and thence with the interior of the pipe fitting 64 carried by the holder 2. Pipe fitting 64 is connected to tube 65. Another suction passage 126 is provided in the neck pin with its upper end in communication with an annular groove 127 at the joint between the neck pin tip and the surrounding portion of the thimble. The passage 126 communicates at its lower end through an annular space 128 with the aforesaid port 120. The glass of the charge (not shown) thus may be settled by vaccum around the tip of the neck pin and in the neck ring. The vacuum condition just described is created under control of the vacuum control spool valve 69 which is opened by operating air applied thereto when the valve 54 is opened by the cam 55 to cause raising of the neck pin to the position shown in Fig. 3.

Counterblowing air is supplied through the tube 21 and the piston rod structure of the permanent structure to the bore of the tubular neck pin adapter and thence to a vertical partial bore 129 in the neck pin. From the bore 129, air passes through one or more inclined passages 130 to the exterior of the neck pin and from the thimble through the opening in the top thereof to the cavity left in the lower end of the glass charge (not shown) when the neck pin has been retracted downwardly in the thimble from the position shown in Fig. 3. This retraction of the neck pin will move its relatively larger middle portion downwardly to an extent sufficient to close the port 120 so that the counterblowing air cannot escape through the vacuum passages.

With suction settling of glass in the neck ring around the neck pin as just described, the counterblowing step may be timed to occur earlier after delivery of a charge into the parison mold than when settling or compacting of the glass is to be effected by a "settle blow" of air under pressure from a settle blowhead applied to the upper end of the mold, this because of a saving of time over that required for application and removal of the settle blowhead and subsequent application of the counterblow baffle to the top of the inverted mold. If desired, the counterblowing step may be commenced while vacuum is still being applied through the passages 118, 119, 119a and between the neck ring halves to the formed and at least partially set glass forming the neck finish portion of the article. This will permit start of the counterblow with minimum of time for setting of the glass after it has been caused to settle in the neck ring. Early start of counterblow reduces the time the outer peripheral surface of the glass in the parison body mold is in chilling contact with the mold wall and tends to obviate undesirable "settle waves" in the side wall of the blown article. These are attended by non-uniformity of thickness of the article side wall, there being an abrupt change of thickness at the line marking the level of the compacted glass before it was counterblown. Even without an earlier start of counterblow after delivery of a charge to the parison mold, suction settling of the glass tends to reduce the "settle waves" in the blown article produced, probably because the glass of the charge is not forced as violently against the inner wall of the parison body mold as when a "blow-down" is used and hence its surface is not chilled so severely and is less stiff when counterblow is effected.

It also is to be noted that the suction passages provided in the conversion unit between the outside vacuum connection and spaces between the neck pin tip and thimble and between the halves of the neck ring, respectively, are of ample size in cross-section to assure quick and effective application of suction and to reduce to a minimum likelihood that these passages will be clogged with lubricant or so-called "dope" from the neck pin or mold parts or by other foreign matter. Since the passages are provided between and in parts which can be readily disassembled, any necessary cleaning of the suction passages can be quickly and easily accomplished.

It thus will be apparent that when the neck pin guiding and positioning cartridge has been interchanged for the pressing plunger guiding and positioning cartridge, the same operating mechanism and pressure fluid lines which were used for the parison pressing operation will be utilized for the operations involved in the formation of a charge of glass into a hollow parison by neck pin action followed by counter-blowing. The interchange of parts to supplement the permanent mechanism for either the parison pressing operation or the neck pin suction settling and counterblowing operation may be effected quickly and easily. The height of the vertical path of reciprocation of the pressing plunger or of the neck pin and the cooperative relationship of the guiding and positioning assembly for either to the molding parts at the molding station may be adjusted within limits by the means previously described for adjusting the cylinder 1 and parts carried thereby vertically. If a further adjustment is required in any particular installation, spacers may be employed.

The term "permanent" as used herein and in appended claims refers to the structure that remains after removal of the pressing plunger and its assembly of guiding and positioning parts to permit substitution therefor of the neck pin and its assembly and positioning parts, or vice versa.

Many modifications and adaptations of the particular embodiment of the invention shown and described will now be obvious or readily occur to those skilled in the art and I therefore do not wish to be limited to the details of the illustrative embodiment.

I claim:

1. In glassware forming apparatus, the combination with a vertically disposed fluid pressure cylinder, a vertical cylindrical holder thereon, and a vertically reciprocable piston rod protruding from the cylinder into said holder and having a free upper end terminating in the holder below the level of the upper end of said holder, of a neck pin, means detachably connecting the neck pin to the upper end of the piston rod, and a unitary assembly of neck pin guiding and positioning elements removably disposed in the holder in operative relation to the neck pin, said assembly comprising an annular piston mounted for limited axial movements in said holder, and a thimble encircling the neck pin and detachably connected to the annular piston for movements therewith.

2. In glassware forming apparatus, the combination with a vertically disposed fluid pressure cylinder, a vertical cylindrical holder thereon, and a vertically reciprocable piston rod protruding from the cylinder into said holder and having a free upper end terminating in the holder below the level of the upper end of said holder of a neck pin, means detachably connecting the neck pin to the upper end of the piston rod, and a unitary assembly of neck pin guiding and positioning elements removably disposed in the holder in operative relation to the neck pin, said assembly comprising a cylindrical casing insertable in said cylindrical holder and having an externally enlarged upper end portion resting on the upper end of the cylindrical holder, an annular piston mounted for limited vertical movements in said cylindrical casing and a thimble encircling the neck pin and detachably connected to said annular piston to move vertically therewith.

3. In glassware forming apparatus, the combination with a vertically disposed fluid pressure cylinder, a vertical cylindrical holder thereon, and a vertically reciprocable piston rod protruding from the cylinder into said holder and having a free upper end terminating in the holder at a lower level than that of the upper end of said holder, of a neck pin, means detachably connecting the neck pin to the upper end of the piston rod, and a unitary assembly of neck pin guiding and positioning elements removably disposed in the holder in operative relation to the neck pin, said assembly comprising an annular piston mounted for limited axial movements in said holder, a thimble encircling the neck pin and detachably connected to the annular piston for movements therewith, an external vacuum connection to the interior of the lower part of said holder, and means for providing a vacuum passage through said unitary assembly for operatively connecting the space in the lower end of an associate overhead inverted parison mold with the external vacuum connection of the holder.

4. In glassware forming apparatus, the combination with a vertically disposed fluid pressure cylinder, a vertical cylindrical holder thereon, and a vertically reciprocable piston rod protruding from the cylinder into said holder and having its upper end terminating in the holder at a lower level than that of the upper end of said holder, of a neck pin, means detachably connecting the neck pin to the upper end of the piston rod, and an assembly of neck pin guiding and positioning elements removably disposed in the holder in operative relation to the neck pin, said assembly comprising a cylindrical casing insertable in said cylindrical holder and having an externally enlarged upper end portion resting on the upper end of the cylindrical holder, an annular piston mounted for limited vertical movements in said cylindrical casing, a thimble encircling the neck pin and detachably connected to said annular piston to move vertically therewith and a coil spring in said cylindrical casing beneath said annular piston yieldingly to maintain the annular piston in a raised position in said casing, and means operable to apply fluid pressure to said annular piston for forcing it downward in said cylindrical casing against the resistance of said coil spring.

5. A glass parison forming conversion unit of the character described comprising a cylindrical casing insertable in an upright, open cylindrical holder constituting a permanent part of a glassware forming machine and in which the upper end of an upright vertically reciprocable piston rod co-axial with the holder is located so as to be constantly below the level of the upper end of said holder, an annular piston mounted for limited vertical reciprocatory movements in the casing in concentric relation with the piston rod, a neck pin adapter comprising a tubular element slidable in the annular piston and attached to the upper end of the piston rod to move vertically with said piston rod independently of the annular piston, said adapter being adapted for supporting connection with a neck pin, and a thimble operatively coupled to the annular piston in position to encircle a neck pin connected with the adapter.

6. A glass parison forming conversion unit of the character described comprising a cylindrical casing insertable in an upright, open cylindrical holder constituting a permanent element of glass parison forming mechanism to be converted, said cylindrical casing having an externally enlarged upper end portion adapted to rest on the upper end of the cylindrical holder and concentrically surrounding an upright, vertically reciprocable piston rod which projects from below upwardly into the holder and also constitutes a permanent element of said forming mechanism, the upper end of said piston rod being constantly below the level of the upper end of said holder, an annular piston mounted in said cylindrical casing for limited vertical movements therein, a tubular neck pin adapter mounted in the annular piston for vertical movements and adapted at its lower end for connection with the upper end of the permanent piston rod in the cylindrical holder so as to be moved vertically when said piston rod is reciprocated, a neck pin carried by the adapter and connected therewith, and a thimble encircling the neck pin and operatively connected with said annular piston for vertical movements therewith.

7. A conversion unit as defined by claim 6 wherein said cylindrical casing has an air passage formed in the wall of its upper portion, said air passage having an inlet located in the casing wall for air receiving communication with an outlet of an air supply passage in the wall of the permanent cylindrical holder and an outlet located in position to discharge air downwardly against a portion of the annular piston in the casing, and a coil spring in the casing underneath the annular piston acting to urge the annular piston to the limit of its upward movement in the casing and yieldable to permit a downward movement thereof by air applied to said annular piston from the passage in the casing.

8. A conversion unit as defined by claim 6 wherein said thimble has a top wall provided with a central opening therein and said neck pin has a reduced tip portion projecing upwardly through said opening when both the thimble and the neck pin are in their raised positions, the permanent piston rod having an internal air passage open at the top of the rod and said tubular adapter and said neck pin being formed to provide a passage therethrough to receive air from said passage in said rod and to discharge air for counter-blowing upwardly from the neck pin through the opening in the top of the thimble when the neck pin has been retracted downwardly from its raised position while the thimble is raised.

9. In a glassware forming apparatus, the combination of a vertically disposed fluid pressure cylinder, a vertical cylindrical holder thereon, an external vacuum connection to the interior of the lower part of said holder, a vertically reciprocable piston rod protruding from the cylinder into said holder and having a free upper end in the holder, a neck pin, means detachably connecting the neck pin to the upper end of the piston rod, and a unitary assembly of neck pin guiding and positioning elements removably disposed in the holder in operative relation to the neck pin, said neck pin being provided with a passage therein having open upper and lower ends, and said unitary assembly being constructed and arranged to cooperate with said holder and with said neck pin to provide a vacuum passage system operatively connecting a space around the neck pin in the lower end of an associate overhead inverted parison mold with the external vacuum connection to the interior of the lower part of said holder when said neck pin has been raised by an upward movement of the piston rod to an operative position in the lower end of said mold, said piston rod, neck pin and the means detachably connecting the neck pin to the upper end of the piston rod being cooperatively formed and arranged to provide a continuous passage for counterblowing pressure fluid extending therethrough and said neck pin and the assembly of neck pin guiding and positioning elements also being constructed and arranged to block off communication between said passage for counterblowing air and the space in the lower end of the associate overhead mold around the neck pin when the neck pin is raised and to open up said communication and close communication between the same space and said vacuum passage system when the neck pin has been retracted downwardly in relation to the lower end of said mold, said vacuum passage system also including a continuously open branch passage communicating through the wall of the lower end of said associate overhead inverted parison mold with the cavity therein so as to permit continuance of application of suction to the outer periphery of glass in the lower end of said mold after said neck pin has been retracted downwardly to permit counterblowing of the glass in the mold and to shut off application of suction to the inner periphery of the glass in the lower end of said mold.

References Cited in the file of this patent

UNITED STATES PATENTS

| | | |
|---|---|---|
| 1,911,119 | Ingle | May 23, 1933 |
| 1,957,410 | Miller | May 1, 1934 |
| 2,075,363 | Smith | Mar. 30, 1937 |
| 2,091,238 | Gordon | Aug. 24, 1937 |
| 2,402,234 | Berthold | June 18, 1946 |
| 2,508,890 | Rowe | May 23, 1950 |
| 2,702,444 | Rowe | Feb. 2, 1955 |

FOREIGN PATENTS

| | | |
|---|---|---|
| 956,843 | France | Feb. 7, 1950 |